US008538184B2

(12) United States Patent
Neogi et al.

(10) Patent No.: US 8,538,184 B2
(45) Date of Patent: Sep. 17, 2013

(54) SYSTEMS AND METHODS FOR HANDLING AND DISTINGUISHING BINARIZED, BACKGROUND ARTIFACTS IN THE VICINITY OF DOCUMENT TEXT AND IMAGE FEATURES INDICATIVE OF A DOCUMENT CATEGORY

(75) Inventors: Depankar Neogi, Wilmington, MA (US); Steven K. Ladd, North Andover, MA (US); Dilnawaj Ahmed, Bangalore (IN); Lohith Chiprawada Shesharam, Bangalore (IN)

(73) Assignee: Gruntworx, LLC, Franklin, NC (US)

( * ) Notice: Subject to any disclaimer, the term of this patent is extended or adjusted under 35 U.S.C. 154(b) by 200 days.

(21) Appl. No.: 12/266,465

(22) Filed: Nov. 6, 2008

(65) Prior Publication Data

US 2009/0119296 A1     May 7, 2009

Related U.S. Application Data

(60) Provisional application No. 60/985,851, filed on Nov. 6, 2007.

(51) Int. Cl.
*G06K 9/40* (2006.01)
*G06F 17/30* (2006.01)

(52) U.S. Cl.
USPC ........... 382/254; 382/168; 382/173; 382/181; 382/275; 707/737; 707/754; 707/755

(58) Field of Classification Search
None
See application file for complete search history.

(56) References Cited

U.S. PATENT DOCUMENTS

| | | | | |
|---|---|---|---|---|
| 5,680,478 A * | 10/1997 | Wang et al. | | 382/176 |
| 5,778,103 A * | 7/1998 | Allan et al. | | 382/254 |
| 5,995,665 A * | 11/1999 | Maeda | | 382/232 |
| 6,393,150 B1* | 5/2002 | Lee et al. | | 382/176 |
| 7,039,856 B2 | 5/2006 | Peairs et al. | | |
| 7,623,712 B2* | 11/2009 | Dai et al. | | 382/180 |
| 7,783,117 B2* | 8/2010 | Liu et al. | | 382/232 |
| 2005/0117803 A1* | 6/2005 | Ikeda et al. | | 382/190 |
| 2005/0244060 A1* | 11/2005 | Nagarajan et al. | | 382/232 |
| 2006/0036649 A1* | 2/2006 | Simske et al. | | 707/200 |
| 2006/0190489 A1* | 8/2006 | Vohariwatt et al. | | 707/104.1 |
| 2007/0201764 A1* | 8/2007 | Jung et al. | | 382/292 |
| 2007/0203885 A1 | 8/2007 | Kim et al. | | |

(Continued)

OTHER PUBLICATIONS

Feng, et al., "Contrast Adaptive Binarization of Low Quality Document Images," IEICE Electronics Express, vol. 1, No. 16, 2004, pp. 501-506, 6 pages.

(Continued)

*Primary Examiner* — Sangwoo Ahn
(74) *Attorney, Agent, or Firm* — Chambliss, Bahner & Stophel, P.C.

(57) ABSTRACT

A method of enhancing electronic documents received from a plurality of users by a document analysis system for improving automatic recognition and classification of the received electronic documents, is provided. For each page of a received electronic document, the method filters the page to infer binarized-background artifacts resulting from the binarization of the original grayscale or color image source document and which reside in the vicinity of binarized text and binarized image features in the page, so that the binarized text and binarized images may be distinguished from the binarized-background artifacts and extracted from the document. The method then uses the extracted features from the filtered document to automatically recognized and classify a document into a document category.

16 Claims, 13 Drawing Sheets

(56) References Cited

U.S. PATENT DOCUMENTS

| | | | |
|---|---|---|---|
| 2007/0247531 A1* | 10/2007 | Deng et al. | 348/226.1 |
| 2008/0062472 A1* | 3/2008 | Garg et al. | 358/402 |
| 2009/0116736 A1 | 5/2009 | Neogi et al. | |
| 2009/0116746 A1 | 5/2009 | Neogi et al. | |
| 2009/0116755 A1 | 5/2009 | Neogi et al. | |
| 2009/0116756 A1 | 5/2009 | Neogi et al. | |
| 2009/0116757 A1 | 5/2009 | Neogi et al. | |
| 2009/0119296 A1 | 5/2009 | Neogi et al. | |

OTHER PUBLICATIONS

Okun, et al., "Robust Text Detection from Binarized Document Images," ICPR, Proceedings of the 16th International Conference on Pattern Recognition (ICPR '02), vol. 3, 2002, IBSN: 0-7695-1695-X, 4 pages.

International Search Report and Written Opinion, International Patent Application No. PCT/US08/82631, mailed Jan. 6, 2009 (8 pages).

* cited by examiner

- WAGES
  - W2 #1
- INTEREST INCOME
  - 1099 INT #1
- RETIREMENT
  - IRA/Pensions/Annuities
    - 1099 R #1
  - Social Security
    - 1099 SSA #1
- SCHED E
  - Partnership
    - 1065 K1 #1
- OTHER INCOME
  - 1099 G #1
- ITEMIZED DEDUCTIONS
  - Mortgage Interest paid
    - 1098 Mortgage #1

FIG. 11

SYSTEMS AND METHODS FOR HANDLING AND DISTINGUISHING BINARIZED, BACKGROUND ARTIFACTS IN THE VICINITY OF DOCUMENT TEXT AND IMAGE FEATURES INDICATIVE OF A DOCUMENT CATEGORY

CROSS REFERENCE TO RELATED APPLICATIONS

This application claims the benefit under 35 U.S.C. §119(e) of U.S. Provisional Patent Application Ser. No. 60/985,851, filed on Nov. 6, 2007, which is hereby incorporated by reference herein its entirety.

This application is related to the following applications filed concurrently herewith, the entire contents of which are incorporated by reference:

U.S. patent application Ser. No. 12/266,472, entitled "Systems and Methods for Classifying Electronic Documents by Extracting and Recognizing Text and Image Features Indicative of Document Categories;"

U.S. patent application Ser. No. 12/266,469, entitled "Systems and Methods for Training a Document Classification System Using Documents from a Plurality of Users;"

U.S. patent application Ser. No. 12/266,468, entitled "Systems and Methods for Parallel Processing of Document Recognition and Classification Using Extracted Image and Text Features;"

U.S. patent application Ser. No. 12/266,462, entitled "Systems and Methods to Automatically Classify Electronic Documents Using Extracted Image and Text Features and Using a Machine Learning Subsystem;" and U.S. patent application Ser. No. 12/266,454, entitled "Systems and Methods for Enabling Manual Classification of Unrecognized Documents to Complete Workflow for Electronic Jobs and to Assist Machine Learning of a Recognition System Using Automatically Extracted Features of Unrecognized Documents."

BACKGROUND

Many software programs are currently available that allow a user to scan a number of paper documents and save them in a single electronic document. The electronic document is typically arranged as a sequence of individual pages. The software programs allow recipients to view, modify, print and store the electronic document. One example of such a document editing program is Adobe Acrobat from Adobe Systems Incorporated of San Jose, Calif.

In many instances, however, the paper documents are scanned in a random, unorganized sequence, which makes it difficult and time-consuming to find a particular page within the electronic document. One solution can be to manually organize the paper documents prior to scanning; however, the individual organizing the paper documents or performing the scanning may not have the skill, knowledge or time needed to correctly organize the paper documents. Additionally, organizing the paper documents prior to scanning can be very time-consuming and expensive. Further, organizing the pages prior to scanning might properly order the pages, but it does not generate a table of contents, metadata, bookmarks or a hierarchical index that would facilitate finding a particular page within the complete set of pages.

Ultimately, the recipient may want the pages of the electronic document organized in a specific order to facilitate finding a particular page in timely and inexpensive manner. For example, an assistant may scan forty pages of tax documents in a random order and save the result in an electronic document. In this example, an accountant may then need to organize the pages of the electronic document in a specific order so that navigating through the electronic document during the preparation and review of an income tax return can be performed in an accurate and efficient manner.

One way that the recipient of an electronic document can organize the pages is by using the thumbnail, metadata and/or bookmark features of the document editing software program. Manually organizing an electronic document, including typing a table of contents, metadata, bookmarks or a hierarchical index, is time-consuming and expensive. Manual organization tends to be ad-hoc, failing to deliver a standardized table of contents, metadata, bookmarks or a hierarchical index for the electronic document.

Another way that the recipient of an electronic document can organize the pages is by using software that assists in manually categorizing document pages. The software provides a user a pre-identified set of types of documents and associates each page with the type selected by the user. This approach requires the recipient to manually categorize each page, a time-consuming and expensive process.

SUMMARY OF THE INVENTION

Systems and methods for handling and distinguishing binarized, background artifacts in the vicinity of document text and image features indicative of a document category are provided. A method of enhancing electronic documents received from a plurality of users by a document analysis system, which automatically recognizes and classifies job documents into document categories, so that a job may be organized according to the document categories it contains, and in which each received document is a binarized, one-bit-per-document-pixel image version of an original grayscale or color image source document, is provided. For each page of a received document, the method filters the page to infer binarized-background artifacts resulting from the binarization of the original grayscale or color image source document and which reside in the vicinity of binarized text and binarized image features in the page, so that the binarized text and binarized images may be distinguished from the binarized-background artifacts and extracted from the document. The method then uses the extracted features from the filtered document to automatically recognized and classify a document into a document category.

BRIEF DESCRIPTION OF THE DRAWINGS

The invention is illustrated in the figures of the accompanying drawings which are meant to be exemplary and not limiting, in which like references are intended to refer to like or corresponding part, and in which:

FIG. 11 illustrates an example of bookmarked document according to a preferred embodiment of the disclosed subject matter;

DETAILED DESCRIPTION

While the prior art attempts to reduce the cost of electronic document organization through the use of software, none of the above methods of document organization (1) eliminates the human labor and accompanying requirements of education, domain expertise, training, and/or software knowledge, (2) minimizes time spent entering and quality checking page categorization, (3) minimizes errors and (4) protects the privacy of the owners of the data on the electronic documents being organized. What is needed, therefore, is a method of performing electronic document organization that overcomes the above-mentioned limitations and that includes the features numerated above.

Preferred embodiments of the present invention provide a method and system for converting paper and digital documents into well-organized electronic documents that are indexed, searchable and editable. The resulting organized electronic documents support more rapid and accurate data entry, retrieval and review than randomly sequenced sets of pages.

Figure 1:
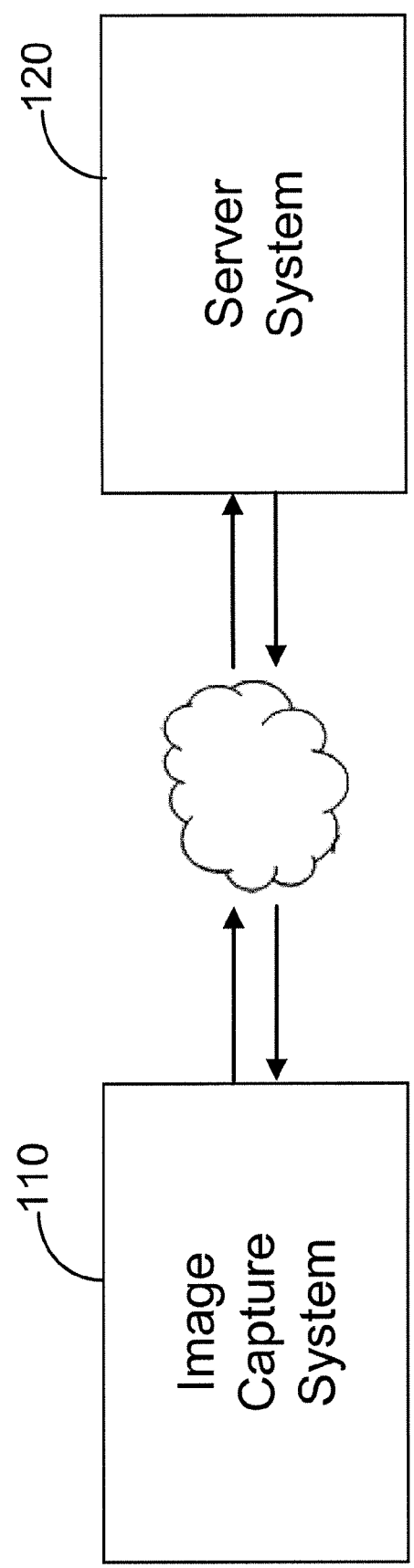
FIG. 1 is a system diagram of a document identification and classification system 100 according to a preferred embodiment of the disclosed subject matter.

FIG. 1 is a system diagram of a document identification and classification system 100 according to a preferred embodiment of the invention. System 100 has an image capture system 110 and a server system 120. The image capture system is connected to the production servers by a network such as a local-area network (LAN,) a wide-area network (WAN) or the Internet. The preferred implementation transfers all data over the network using Secure Sockets Layer (SSL) technology with enhanced 128-bit encryption. Encryption certificates can be purchased from well respected certificate authorities such as VeriSign and that or can be generated by using numerous key generation tools in the market today, many of which are available as open source. Alternatively, the files may be transferred over a non-secure network, albeit in a less secure manner.

Under typical operation, System 110 is an image capture system that receives physical documents and scans them. The image capture system is described in greater detail below.

Under typical operation, System 120 is a server system that receives the scanned documents over the Internet. Once received, the server system organizes the classified pages per a predetermined scheme into a new, organized document. The server system includes a mechanism for learning documents. The server system is described in greater detail below.

Figure 2:
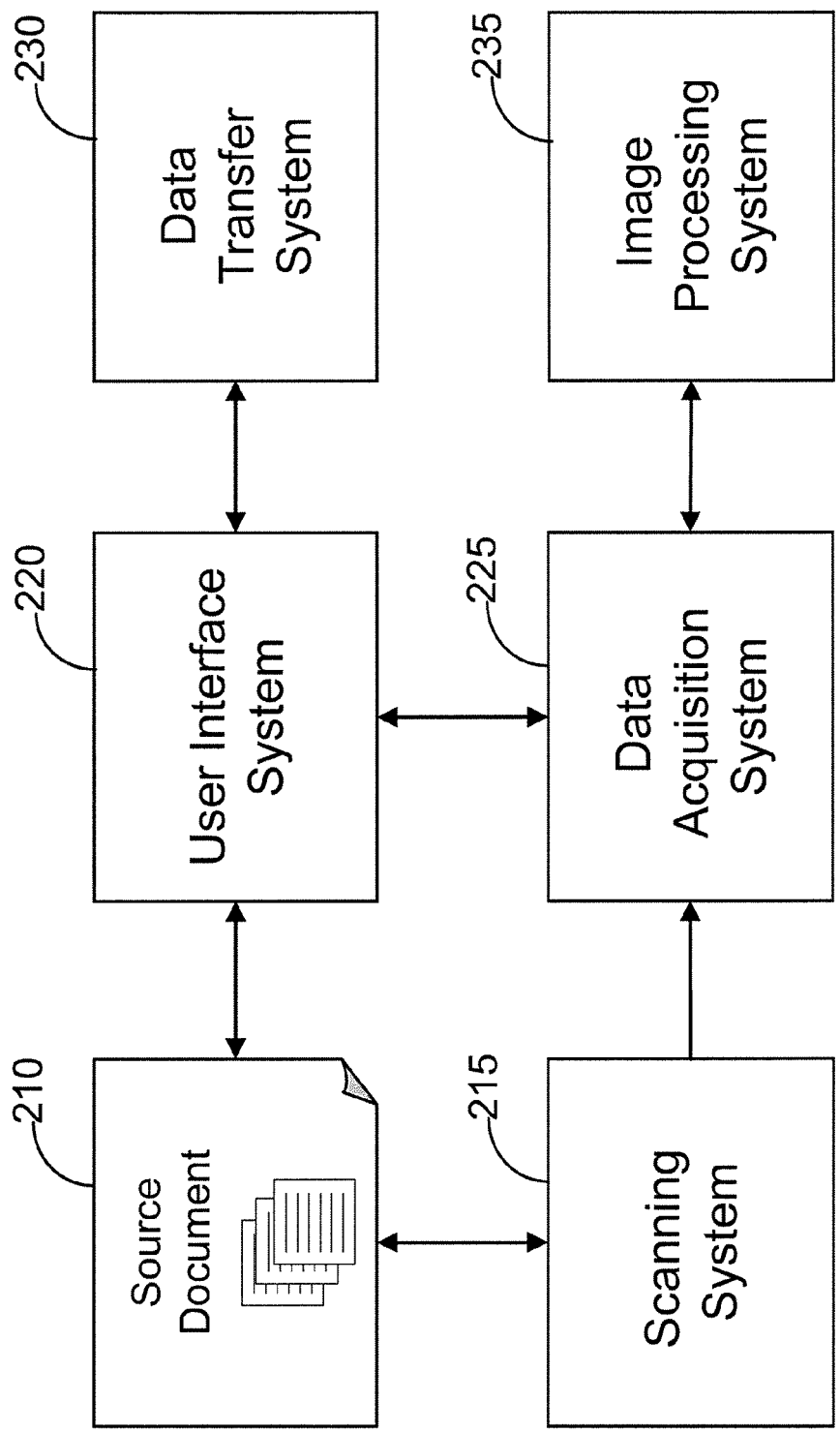
FIG. 2 is a system diagram of the image capture system 110 according to a preferred embodiment of the disclosed subject matter.

FIG. 2 is system diagram of the image capture system 110 according to a preferred embodiment of the invention. System 110 has a source document 210, a user interface system 220, a data transfer system 230, a scanning system 215, a data acquisition system 225 and an image processing system 235. Source documents in the form of papers are physically placed on an input tray of a commercial scanner. Source documents in the form of data files are received over a network by the user interface system. The user interface system communicates with the data transfer system via software within a computer system. The user interface system communicates with the data acquisition system via software within a computer system. The data acquisition system communicates with the scanning system via a physical connection, such as a high-speed Universal Serial Bus (USB) 2.0, or, optionally, over a network. The data acquisition system communicates with the image processing system via software within a computer system.

Element 210 is a source document in the form of either one or more physical papers or a digital file containing images of one or more papers. The digital file can be in one of many formats, such as PDF, TIFF, BMP, or JPEG.

Figure 3:
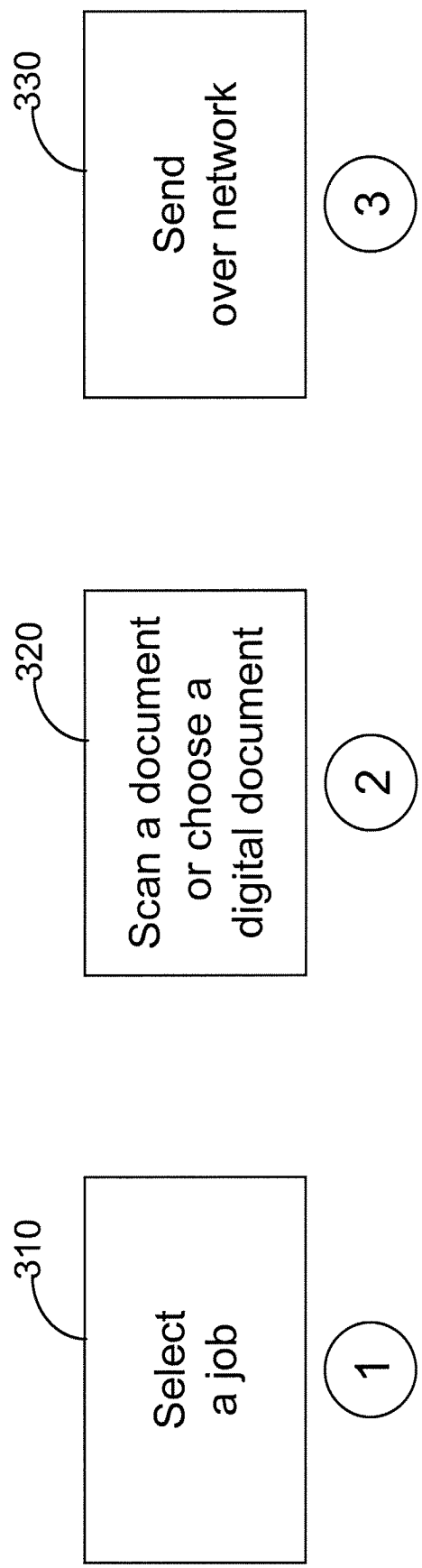
FIG. 3 is an illustration of three-step document submission process according to a preferred embodiment of the disclosed subject matter.

System 220 is a user interface system. Under preferred embodiments, the user interface system runs in a browser and presents a user with a three-step means for submitting documents to be organized as shown in FIG. 3. In step one, the user interface system provides a mechanism for selecting a job from a list of jobs; additionally, it allows jobs to be added to the job list. In step two, the user interface system provides a mechanism for initiating the scanning of physical papers; additionally, is provides a browsing mechanism for selecting a file on a computer or network. Optionally, one or more sets of papers can be scanned and one or more files can be selected. In step three, the user interface system provides a mechanism for sending the job information and selected documents over a network to the server system. Under preferred embodiments, the user interface system also presents a user with the status of jobs that have been submitted as submitted or completed; optionally, it presents the expected completion date and time of submitted jobs that have not been completed. The user interface system also presents a user with a mechanism for receiving submitted documents and organized documents. The user interface system also provides a mechanism for deleting files from the system.

System 230 is a data transfer system. Under preferred embodiments, the data transfer system manages the SSL connection and associated data transfer with the server system.

System 215 is a scanning system. Under preferred embodiments, conventional scanning systems may be used such as those from Bell+Howell, Canon, Fujitsu, Kodak, Panasonic and Xerox. The scanning system captures an image of the scanned document as a computer file; the file is often in a standard format such as PDF, TIFF, BMP, or JPEG.

System 225 is a data acquisition system. The data acquisition system controls the settings of the scanning system. Many scanning systems in use today require users to manually set scanner settings so that images are captured, for example, at 300 dots per inch (dpi) as binary data (black-and-white.) Commercial scanners and scanning software modify the original source document image that often include high resolution and, possibly, color or gray-scale elements. The resolution is often reduced to limit file size. Color and gray-scale elements are often binarized, e.g. converted to black or white pixels, via a process known as threshholding, also to reduce file size. Under preferred embodiments, the data acquisition system sets the scanning system to scan pages double-sided at 300 dpi with eight bits of gray scale. The data acquisition system commands the scanning system to begin operation and receives the scanned document computer file from the scanning operation.

System 235 is an optional image processing system. The image processing system enhances the image quality of scanned images for a given resolution and other scanner settings. The image processing system may be implemented as part of the image capture system as depicted on FIG. 2 or as part of the server system as depicted on FIG. 8. Details of the image processing system are described in further detail below as part of the server system.

Figure 4:
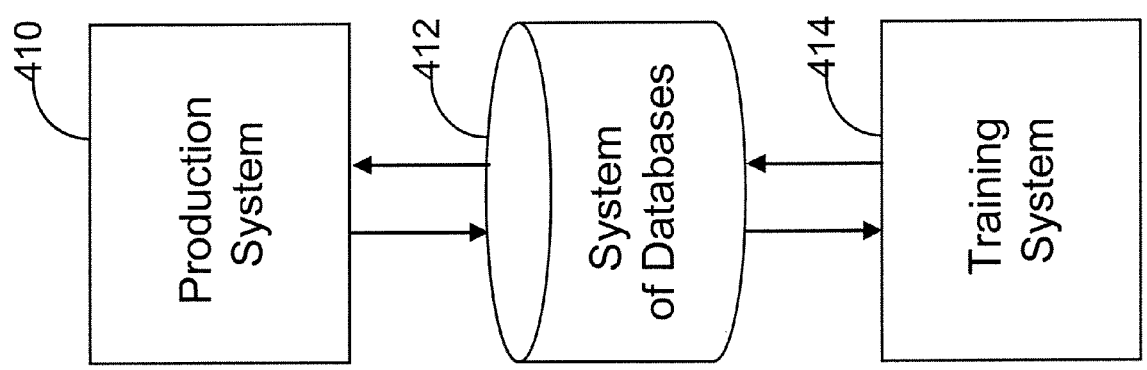
FIG. 4 is a system diagram of the server system 120 according to a preferred embodiment of the disclosed subject matter.

FIG. 4 is a system diagram of the server system 120 according to a preferred embodiment of the invention. System 120 has a production system 410, a system of databases 412 and a training system 414. Under preferred embodiments, the production system is connected to the system of databases by a gigabit Ethernet connection. Under preferred embodiments, the training system is connected to the system of databases by a gigabit Ethernet connection.

The production system classifies each of the pages in the document as one of a pre-identified set of types of documents. The production system organizes the classified pages per a predetermined scheme into a new, organized document. The production system stores the original scanned document and the organized document. The production system is described in greater detail below.

The system of databases is comprised of a content repository, a job database, a class database and a training database. The system of databases is described in greater detail below.

The training system utilizes supervised learning to provide a growing set of documents with characterized feature sets to the class database. The training system is described in greater detail below.

Figure 5:
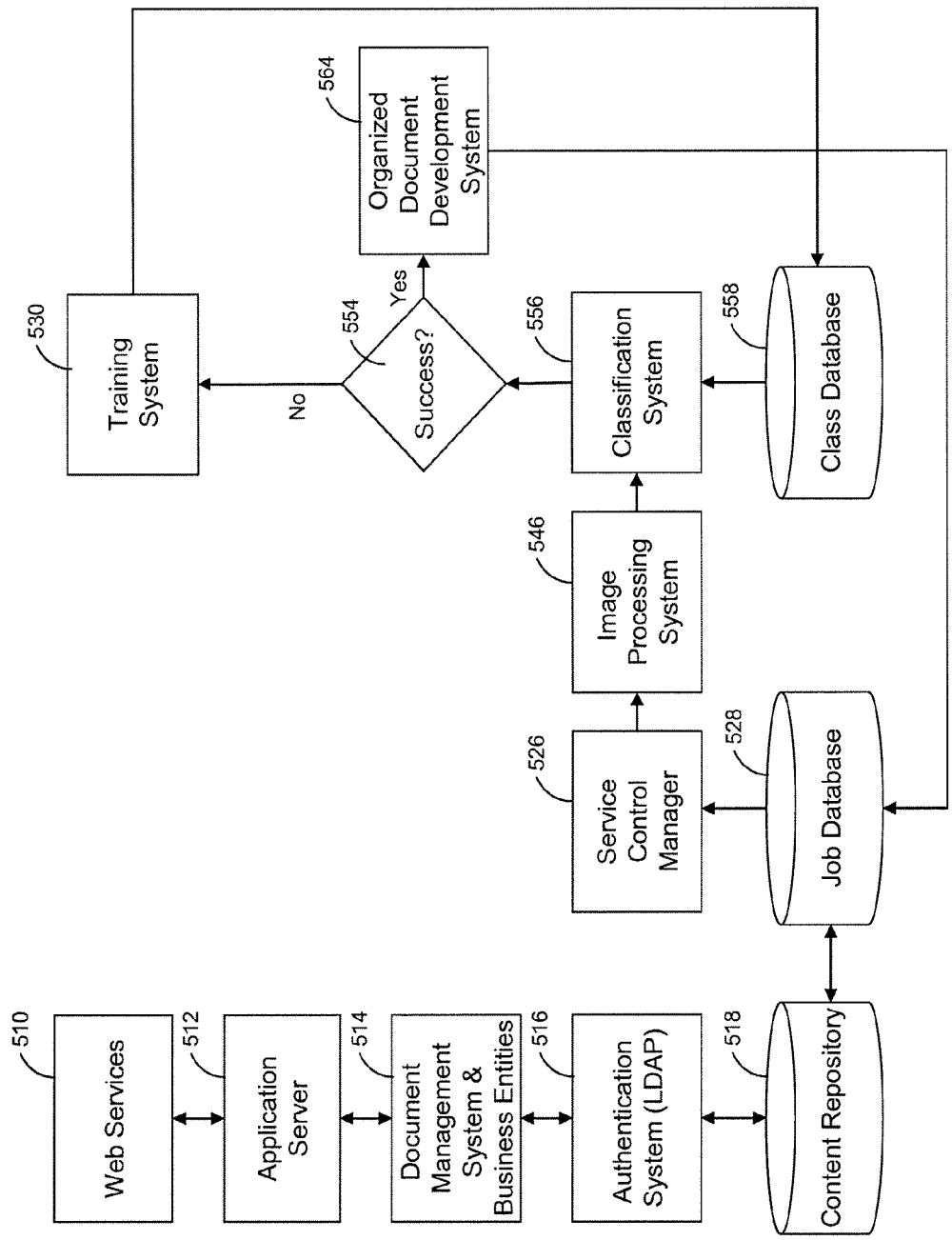
FIG. 5 is a system diagram of the production system 410 according to a preferred embodiment of the disclosed subject matter.

FIG. 5 is a system diagram of the production system. System 410 has a web services system 510, an application server 512, a document management system and business entities (DMS) 514, a LDAP authentication system 516, a content repository 518, a job database 528, a service control manager 526, an image processing system 546, a classification system 556, a success evaluation system 554, an organized document development system 564, a training database 532, a training system 530 and a class database 558.

FIG. 5 shows the overall system that represents the server-side operation of the automatic organization of electronic documents. The system is comprised of several modules that help in automating and improving the accuracy of the results. The system may be built in a highly distributed architecture and consists of several independent processes, data repositories and databases which communicate and pass messages to each other via well defined standard and proprietary interfaces. Even though the system may be built in a loosely coupled manner to achieve maximum scalability and throughput, the same results can be achieved if the system was more tightly coupled in a single process with each module being a logical entity of the same process. Furthermore, the design of the system considers multiple different product types which may need to process anywhere from hundreds to millions of documents every day for tens to thousands of customers in different markets. Another advantage of the above system design is that it allows the server(s) to be hosted in a secure data center. Documents from healthcare, insurance, banking, government, tax and other applications which will go through the recognition and organization processing system will need security applied per policies that are HIPAA, GLBA, SAS70, etc. compliant.

The web services 510 system provides the server system connection to the network that interfaces with the image capture system. Such a network could be a local-area network (LAN), a wide-area network (WAN) or the Internet. As described above, the preferred implementation transfers all data over the network using Secure Sockets Layer (SSL) technology with enhanced 128-bit encryption. Standard web services include Apache, RedHat JBoss Web Server, Microsoft IIS, Sun Java System Web Server, IBM Websphere, etc. The primary web service requirement is that the module should be able to handle multiple HTTP or HTTPS requests from different users as they upload their source electronic documents or download their organized electronic document, in a secure manner. The web service should also be able to relay any necessary parameters to the application servers which will process the electronic document.

The application server 512 provides necessary clustering, caching, load-balancing and persistence of the application for a distributed deployment of large scalable enterprise applications. The application layer manages transaction context as documents are uploaded and downloaded to the system and maintains all necessary service integrity. The application server also provides messaging services, mail services, security services, and connection pool, all of which make the service available to handle a large number of requests simultaneously.

The document management system (DMS) 514 and the business object layer capture the business entities. The DMS is generally a computer-based system or set of servers used to track and store electronic documents and/or images of paper documents. The DMS also commonly provide storage, versioning, metadata, security, as well as indexing and retrieval capabilities. Simple functions could include adding or retrieving an electronic document of a user. System 514 handles complex business hierarchies for a large number of users across multiple organizations. This is achieved by designing appropriate business objects that access the data access objects (DAO) with appropriate privileges and permissions. The data access objects implement the access mechanism to the data sources. The data source could be a persistent store like an RDBMS, an external service like a B2B exchange, a repository such as the LDAP database of System 516, or a business service accessed via CORBA Internet Inter-ORB Protocol (IIOP) or low-level sockets. The business component that relies on the DAO uses the simpler interface exposed by the DAO for its clients. The DAO completely hides the data source implementation details from its clients. Because the interface exposed by the DAO to clients does not change when the underlying data source implementation changes, this pattern allows the DAO to adapt to different storage schemes without affecting its clients or business components. Essentially, the DAO acts as an adapter between the component and the data source.

The authentication system 516 allows secure and authorized access to the content repository. Under preferred embodiments, an LDAP authentication system is used; however, other authentication systems can also be used. In general, an LDAP server is used to process queries and updates to an LDAP information directory. For example, a company could store all of the following very efficiently in an LDAP directory:

The company employee phone book and organizational chart

External customer contact information

Infrastructure services information, including NIS maps, email aliases, and so on Configuration information for distributed software packages Public certificates and security keys.

Under a preferred embodiment, document organization and access rights are managed by the access control privileges stored in the LDAP repository.

The content repository 518 can be simple file system, a relational database or an object oriented database. Under a preferred embodiment, the content repository is based on Java Standard Requests 170 (JSR 170). JSR 170 is a standard implementation-independent way to access content bi-directionally on a granular level within a content repository. The content repository is a generic application "data store" that can be used for storing both text and binary data (images, word processor documents, PDFs, etc.). One key feature of a content repository is that one does not have to worry about how the data is actually stored: data could be stored in a relational database (RDBMS) or a file system or as an XML document. In addition to providing services for storing and retrieving the data, most content repositories provide advanced services such as uniform access control, searching, versioning, observation, locking, and more.

Under preferred embodiments, documents in the content repository are available to the end user via a portal. For example, in the current implementation of the system, the user can click on a web browser application button "View Source Document" in the portal and view the original scanned document over a secure network. Essentially, the content repository can become an off-site secure storage facility for the user's electronic documents.

The job database 528 is used to receive, then process and finally post the user's job back to the content repository. A "job" is defined as the steps of automatically organizing the electronic document from their original scanned images. Module 649 can be file system storage, a relational database, XML document or a combination of these. In the current implementation, the system uses both file system storage to store large blob (binary large objects) and a relational database to store pointers to the blobs and other information pertinent to processing the job.

The service control manager (SCM) 526 is a system that controls the state machine for each job. The state machine identifies the different states and the steps that a job has to progress through to achieve its final objective, in this case being an organized electronic document. In the current system, the SCM is designed to be highly scalable and distributed. Under preferred embodiments, the SCM is multi-threaded to handle hundreds of jobs at any given time. It also implements message queues to communicate with other processes regarding their own states. The SCM can be implemented in other architectures as well. For example, one can implement a complete database driven approach to step through all the different steps required to process such a job.

In preferred implementations the SCM subscribes to events for each new incoming job that need to be processed. Once a new job arrives, the SCM pre-processes the job by taking the electronic document and separating each image (or page) into its own bitmap image for further processing. For example, if an electronic document had 30 pages, the system will create 30 images for processing. Each job in the system is given a unique identity. Furthermore, each page is given a unique page identity that is linked to the job identity. After the SCM has created image files by pre-processing the document into individual pages, it transitions the state of each page to image processing.

The image processing system 546 removes noise from the page image and properly orients the page so that document image analysis can be performed more accurately. The accuracy of the document recognition greatly depends on the quality of the image; thus image processing is included under preferred embodiments. The image processing system performs connected component analysis and, utilizing a line detection system, creates "confetti" images which are small sections of the complete page image. Under preferred embodiments, the confetti images are accompanied the coordinates of the image sub-section. The image processing system is discussed in greater detail below.

The classification system 556 recognizes the page as one of a pre-identified set of types of documents. A major difficulty in categorizing a page as one of a large number of documents is the high dimensionality of the feature space. Conventional approaches that depend on text categorization alone are faced with a native feature space that consists of many unique terms (words as well as phrases) that occur in documents, which can be hundreds or thousands of terms for even a moderate-sized collection of unique documents. In one domain, multiple systems that categorize income tax documents such as W-2, 1099-INT, K-1 and other forms have experienced poor accuracy because of the thousands of variations of tax documents. The preferred implementation uses a combination of image pattern recognition and text analysis to distinguish documents and machine learning technology to scale to large numbers of documents. The classification system is described in greater detail below.

The class database 558 contains the trained set of information produced and used by the systems learning engine. As the system grows "smarter" by recognizing more classes and variations of documents, the class database grows. As the machine learning system sees more trained documents, its classification accuracy increases.

The success evaluation system 554 determines how the document is treated once the classification process has been completed. If the classification system successfully classifies the document, the document is directed to System 564, the organized document development system described below. If the classification system fails to recognize the document with a high level of confidence, the document is directed to System 530, a training system, described below.

The training system 530 performs computations on the data in its document database corresponding to the classification systems that are in place and generates datasets used by the classification system for recognizing source documents. The results of the training and re-training process are classification datasets that are updated in the class database. The training system is described in greater detail below.

Thus, the system implements a continuous learning process in which a document that is not accurately identified is sent for training. Training results in an expanded data set in the class database 558, thereby improving the accuracy of the system over time. As the class database grows, the system requires an asymptotically lower percentage of documents to be trained.

Figure 6:
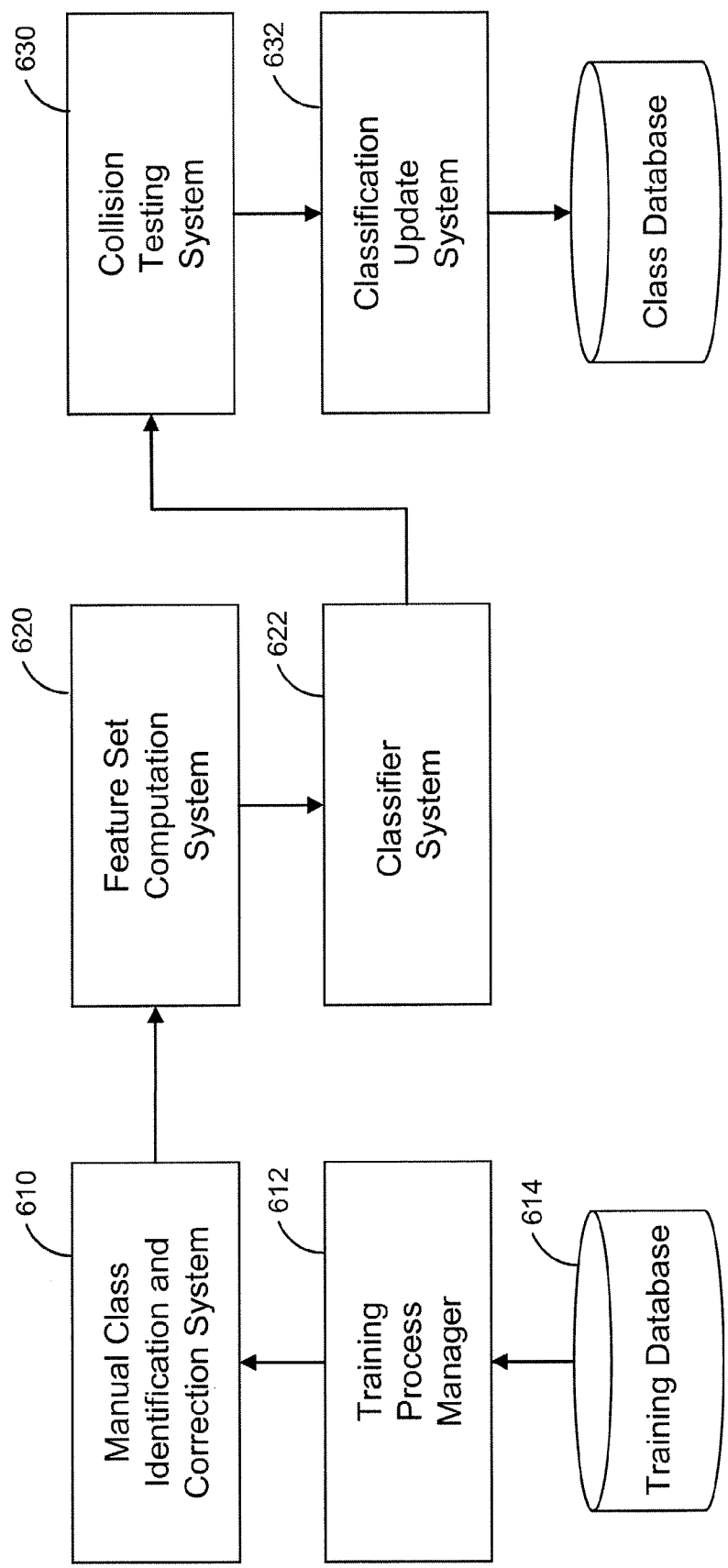
FIG. 6 is a system diagram of the training system 530 according to a preferred embodiment of the disclosed subject matter.

FIG. 6 is a system diagram of the training system. System 530 has a manual class identification and correction system, a feature set computation system, a collision testing system, a training process manager, a classifier system, and a classification update system.

Preferred implementations use machine learning supported by the training system that adapts to a growing set of documents. Additional documents add additional features that must be analyzed. Preferred implementations of the training system include tuning and optimization to handle noise generated during both the training phase and the testing phase. The training phase is also called learning phase since the parameters and weights are tuned to improve the learning and adaptability of the system by fitting the model that minimizes the error function of the dataset.

The learning technique in the preferred implementation is supervised learning. Applications in which training data comprises examples of input vectors along with their corresponding target vectors are known as supervised learning problems. Example input vectors include key words and line patterns of the document layouts. Example target vectors include possible classes of output in the organized document. Supervised learning avoids the unstable states that can be reached by unsupervised learning and reinforcement learning systems.

The learning system receives documents into a training database 614 from the success evaluation system. These documents are not trained and do not have corresponding classification model data in the class database. All such documents are made persistent in the training database.

The training database 614 has several tables which contain the document class information as well as image processing information (which is discussed in greater detail below.) The following tables are part of training database:
  Form class (classification view)
  Page table (details of the page of the electronic document)
  Manual classification table (manual work information)
  Manual training table (trainers' information)
  Confetti table (confetti information, original text, corrected text, etc.).

The training process manager 612 is a system that manages the distribution of the training task. Under preferred embodiments, a user, called a "trainer," logs into the system in which the trainer has privileges at one of three levels.
  Trainer levels:
  Top tier: add new classes to the system and perform classification and training
  Middle tier: perform manual classification and training
  Bottom tier: only perform training (manual text correction).

The training process manager directs document processing based on the document state:
  Unclassified page is scheduled for manual classification
  Manual classification is done as per policy and form class is assigned
  Job database is updated with form class information and page/job states are changed so that the page can go to next state
  If the form class state is not trained, the form is scheduled for training, else no action is needed.

After form training, the form class state is changed to trained, not synched if allowed by policy. The document class has the following states:
  Untrained
  Partially trained
  Trained, need synch with classification database
  Trained, synched with classification database.

The manual identification and text correction system processes each document that requires training. The trainer follows two independent steps:
  Manually classifying the form and assigning a class and subclass
  Manually correcting OCR text (name required training for now).

The manual identification and text correction system 610 is comprised of a number of elements:
  Receive pages from the training manager which manages the flow of pages between various trainers and implements training policy and restrictions
  Manual classification user interface (UI) which presents the page and asks the user to classify it
  Manual text correction UI which presents the page with marked up confetti. The user views the confetti and corrects the text extracted from the confetti
  Training viewer UI is used to view the training database in an UI. The preferred implementation includes reports and representations of the training database
  Classification verification UI presents a page and its classification to a trainer.
  All user interfaces are integrated into a single system.

The feature set computation system 620 combines the document image, the manually classified information and the corresponding text.

The feature set computation system is the point-pattern matching data which is described in greater detail below.

The classifier system 622 creates a global dictionary (GD) and global priority (GPr) of a word based on the words it receives from each document after OCR correction. Global Priority is formulated as:

$$GPr = MPr * \log(\text{total no. of classes/total no. classes in which the word appears})$$

where GPr is the global priority of the word and MPr is the mean priority of the word among the classes it is presented. For example, if word1 is present in class1 with priority p1, in class2 with priority p2, in class3 with priority p3, then:

$$MPr = (p1 + p2 + p3)/3$$

If in total there are Nc classes, then:

$$GPr \text{ of word1} = (p1 + p2 + p3)/3 * \log(Nc/3).$$

Thus, we take inverse word frequency as log (total no of classes/total no classes in which the word appears). So that if a particular word is present in almost all classes then its priority will be low.

With the value of the priority, a particular word can be determined to be a stop word or not. The preferred implementation stores all the word in a Trie data structure to maximize search speed. With all the words in the global dictionary, a trellis of bi grams of letters is built which is used during prediction of a letter during document OCR.

Below is an example of 2 different classes (W-2 and 1099-INT) and their priorities and key words:
Form Name: 1099-INT

| | |
|---|---|
| payer | 0.666667 |
| name | 0.333333 |
| address | 0.333333 |
| account | 0.333333 |
| deferrals | 0.333333 |
| income | 0.333333 |
| rents | 0.333333 |
| royalities | 0.333333 |
| omb | 0.666667 |
| federal | 0.333333 |
| compensation | 0.333333 |
| tax | 0.333333 |
| parachute | 0.333333 |
| misc | 1 |
| substitute | 0.333333 |
| recipient | 0.666667 |
| int | 1 |

-continued

|            |          |
|------------|----------|
| foreign    | 0.666667 |
| with drawl | 0.333333 |
| rtn        | 0.666667 |
| penalty    | 0.333333 |
| investment | 0.333333 |

Form Name: W2

|              |          |
|--------------|----------|
| employer     | 0.666667 |
| wages        | 1        |
| employee     | 0.333333 |
| social       | 0.333333 |
| security     | 0.333333 |
| dependent    | 0.333333 |
| federal      | 0.333333 |
| name         | 0.333333 |
| address      | 0.333333 |
| compensation | 0.666667 |
| tax          | 0.333333 |
| omb          | 0.666667 |
| income       | 0.333333 |

The Global Dictionary and Global Priorities for the Above Example are:

|              |          |
|--------------|----------|
| payer        | 0.462098 |
| name         | 0        |
| address      | 0        |
| account      | 0.231049 |
| deferrals    | 0.231049 |
| income       | 0        |
| rents        | 0.231049 |
| royalities   | 0.231049 |
| omb          | 0        |
| federal      | 0        |
| compensation | 0        |
| tax          | 0        |
| parachute    | 0.231049 |
| misc         | 0.693147 |
| substitute   | 0.231049 |
| recipient    | 0.462098 |
| int          | 0.693147 |
| foreign      | 0.462098 |
| withdrawal   | 0.231049 |
| rtn          | 0.462098 |
| penalty      | 0.231049 |
| investment   | 0.231049 |
| employer     | 0.462098 |
| wages        | 0.693147 |
| employee     | 0.231049 |
| social       | 0.231049 |
| security     | 0.231049 |
| dependent    | 0.231049.|

The above table shows that words like "omb," "name," "address," etc have priorities zero as they are present in all the documents; hence, they are stop words. Words that occur more frequently in all the forms have less priority.

The collision testing system 630 performs tests across a large set of trained documents to ensure that previously trained documents do not collide or break with the newly added information. Under preferred embodiments, a large regression suite is built as part of the collision testing system.

The classification update system 632 inserts new trained data that passes regression testing into the class database.

Figure 7:
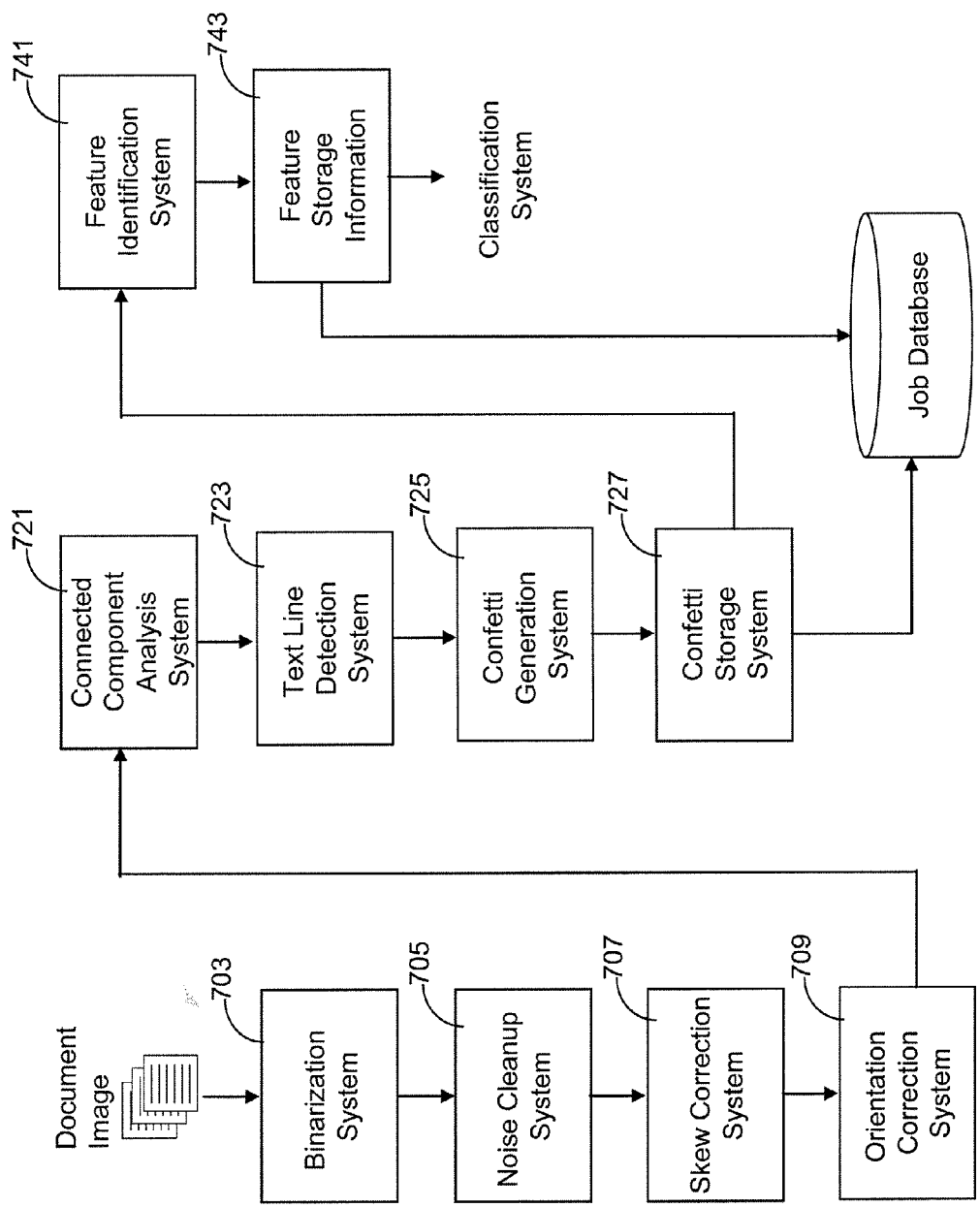
FIG. 7 is a system diagram of the image processing system 546 according to a preferred embodiment of the disclosed subject matter.

FIG. 7 is a system diagram of the image processing system. System 546 has a binarization system, a noise cleanup system, a skew correction system, an orientation correction system, a connected component analysis system, a text line detection system, a confetti generation system, a confetti storage system, a feature identification system and a feature storage system.

Source document images can have salt-pepper noise, skew, orientation in any direction and/or color or gray scale elements. A document can be captured as a color, grayscale or binary image by a scanning device. Common problems seen in images from scanning devices include:
- poor contrast due to lack of sufficient or controllable lighting
- non-uniform image background intensity due to uneven illumination
- immoderate amount of random noises due to limited sensitivity of the sensors.

Many document images are rich in color and have complex backgrounds. Accurately processing such documents typically requires time-consuming processing and manual tuning of various parameters. Detecting text in such documents, which is necessary for text analysis, is difficult for typical text recognition systems that are optimized for binary images on clean backgrounds. For the classification system to work well, document images must be binarized and the text must be readable. Typically, general purpose scanners binarize images using global threshholding utilizing a single threshold value, generally chosen on statistics of the global image. Global threshholding is not adapted well for images that suffer from common illumination or noise problems. Global threshholding often results in characters that are broken, merged or degraded; further, thousands of connected components can be caused by binarization noise. Images degraded by global threshholding are typically candidates for low quality pattern recognition and text analysis.

The preferred embodiment of the binarization system utilizes local threshholding where the threshold value varies based on the local content in the document image. The preferred implementation is built on a adaptive threshholding technique which exploits local image contrast (reference: *IEICE Electronics Express*, Vol. 1, No 16, pp. 501-506.) The adaptive nature of this technique is based on flexible weights that are computed based on local mean and standard deviations calculated for the gray values in the primary local zone or window. The preferred embodiment experimentally determines optimum median filters across a large set of document images for each application space.

The noise cleanup system removes dots, specks and blobs from documents. In the preferred embodiment, minimum and maximum dot size are specified. The preferred embodiment also performs image reversal so that white text or line objects on black backgrounds are detected and inverted to black-on-white. The preferred embodiment also performs two noise removal techniques.

The first technique starts with any small region of a binary image. The preferred implementation takes a 35×35 pixel region. In this region all background pixels are assigned value "0." Pixels adjacent to background are given value "1." A matrix is developed in this manner. In effect each pixel is given a value called the "distance transform" equal to its distance from the closest background pixel. The preferred implementation runs a smoothing technique on this distance transform. Smoothing is a process by which data points are averaged with their neighbors in a series. This typically has the effect of blurring the sharp edges in the smoothed data. Smoothing is sometimes referred to as filtering, because smoothing has the effect of suppressing high frequency signals and enhancing low frequency signals. Of the many different methods of smoothing, the preferred implementation uses a Gaussian kernel. In particular, the preferred implementation performs Gaussian smoothening with a filter using variance of 0.5 and a 3×3 kernel or convolution mask on the distance transform. Threshholding with a thresholding value of 0.85 is performed on the convolved images and the resulting data is converted to its binary space. This method has been tested across a large number of noisy documents and the results have been found to be good.

The second technique uses connected component analysis (discussed in greater detail below) to identify small or bad blocks. In this method a sliding mask is created of a known size. The preferred implementation uses a mask that is 35×35 pixels wide. This mask slides over the entire image and is used to detect the number of blobs (connected components) that are less than 10 pixels in size. If the number of blobs is greater than five, then all blobs are removed. This process is repeated by sliding the mask over the entire image.

The skew correction system fixes small angular rotations of the entire document image. Skew correction is important for the document analysis module because it improves text recognition, simplifies interpretation of page layout, improves baseline determination, and improves visual appearance of the final document. Several available image processing libraries do skew correction. The preferred implementation of skew detection is part of the open source Leptonica image processing library.

The orientation correction system aligns document images so that they can be most easily read. Documents, originally in either portrait or landscape format may be rotated by 0, 90, 180 or 270 degrees during scanning. There are three preferred implementations of orientation correction.

The first method detects blocks of text in the image and measures each with respect their block height and width. In portrait documents, the average width is more than average height. An average count of the width and height is performed and if the width to height ratio is above a certain threshold, the document is determined to be portrait or landscape.

The second method performs a baseline analysis, counting the pixels in ascenders and descenders along any line in a document. Heuristically, the number of ascenders is found to be more than the number of descenders in English language documents that are correctly oriented. The document is oriented so that ascenders outnumber descenders.

The third method performs OCR is on small words or phrase images at all four orientations: 0, 90, 180 and 270 degrees. Small samples are selected from a document and the confidence is averaged across the sample. The orientation that has the highest confidence determines the correct orientation of the document.

The connected component analysis system implements a very standard technique. In the preferred implementation the open source Image Processing Library 98 (IPL98) is used for connected component analysis.

The text line detection system implements a technique described by Okun et al. (reference: "Robust Text Detection from Binarized Document Images") to identify candidate text segments blocks of consistent heights. For a page from a book, this method may identify a whole line as a block, while for a form with many boxes this method will identify the text in each box.

The confetti generation module identifies all the coordinates of the blocks.

The confetti storage system stores the confetti information in the appropriate persistent storage.

The job database stores confetti information for each job.

Figure 8:
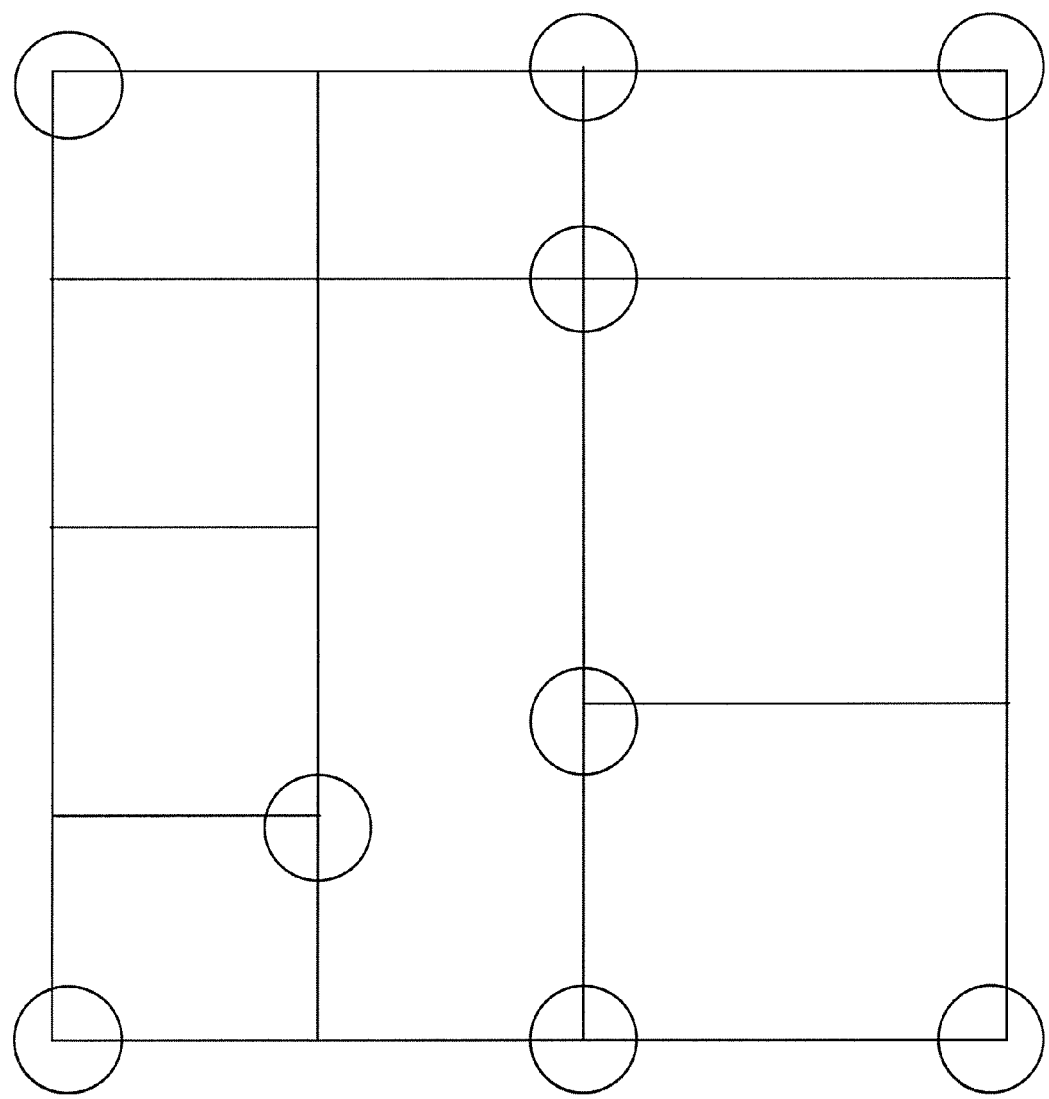
FIG. 8 is an illustration of an example of nine types of point patterns according to a preferred embodiment of the disclosed subject matter.

The feature identification system looks for point and line features. The preferred implementation performs image layout analysis using two image properties, the point of intersection of lines and edge points, as shown in FIG. 8, of text paragraphs. Every unique representation of points is referred as a unique class in the system and represents a unique point pattern in the system database. The preferred implementation uses a heuristically developed convolution method only on black pixels to perform a faster computation The system identifies nine types of points: four T's, four L's, and one cross (X) using nine masks.

The preferred implementation of point pattern matching is performed by creating a string from the points detected in the image and then using the Levenshtein distance to measure the gap between the trained set with the input image. The Levenshtein distance between two strings is given by the minimum number of operations needed to transform one string into the other, where an operation is an insertion, deletion, or substitution of a single character.

The feature storage system saves the calculated features for each document.

Figure 9:
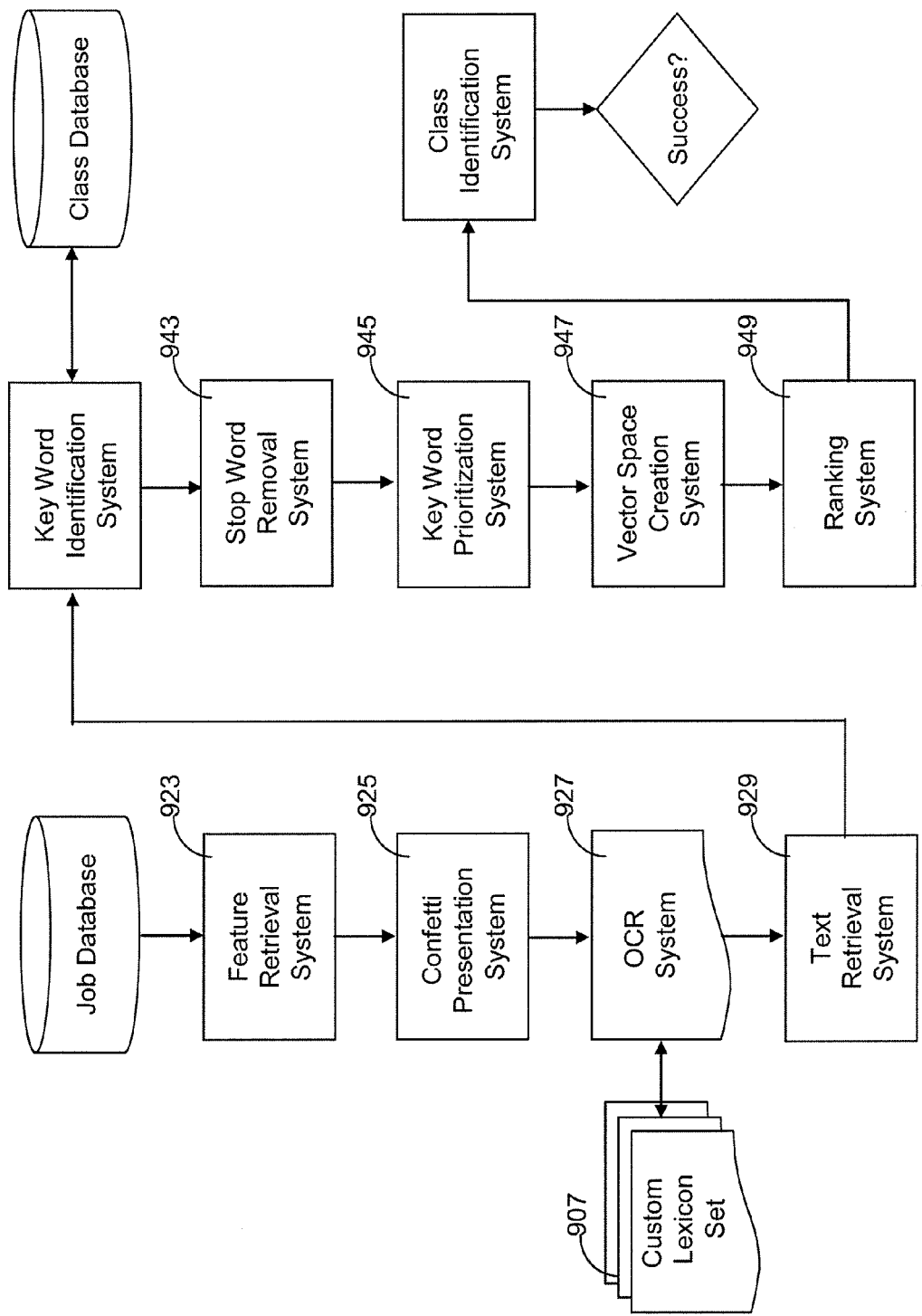
FIG. 9 is a system diagram of the classification system 556 according to a preferred embodiment of the disclosed subject matter.

FIG. 9 is a system diagram of the classification system. System 556 has a custom lexicon set 907, a feature retrieval system 923, a confetti presentation system 925, an OCR system 927, a text retrieval system 929, a key word identification system 941, a stop word removal system 943, a key word prioritization system 945, a vector space creation system 947, a ranking system 949 and a class identification system 965.

The preferred implementation performs classification using both image-level features and textual features. The key challenge in classification architecture is defining the classifier appropriate to the domain. Many forms and documents, such as business letters, tax forms, mortgage applications, health insurance forms, etc., have structural layouts and associated text, each of which have important domain information.

The feature retrieval system receives confetti images and point pattern image features (discussed above) for a document from the job database and presents them to the OCR system. Several optical character recognition (OCR) software programs are available in the market today. The preferred implementation uses Tesseract, an open source software which allows custom modifications. In the preferred implementation, a custom domain-specific lexicon set has been added to the system to improve the accuracy of the system. During training of the document for a particular domain, several key words are collected that are made part of the custom lexicon set of that domain classifier.

The OCR system converts each confetti image into text.

The text retrieval system presents the text to the key word identification system.

The key word identification system receives the confetti text and interfaces with the class database. The class database consists of the global dictionary and global priority words which are created by the training process and the point pattern signatures of all the trained forms.

Under the preferred embodiment, the stop word removal system removes stop words from the list of text that was received from the text retrieval system. Stop words are common words—for example: "a," "the," "it," "not," and, from the W-2 and 1099-INT example above, words including "omb," "name," "address," etc. The stop words are provided by the class database and, in the preferred embodiment, are domain specific.

The key word prioritization system, in the preferred implementation, calculates the priority of each word as function of line height (LnHt) of the word, partial of full match (PFM)

with form name and total number of words in that form (N). The approximate value of priority is formulated as

*Pr*=(ΣLnHt*PFM)/*N*.

The summation is taken to give more priority to the word whose frequency is higher in a particular form. Partial or Full Match (PFM) increases the priority if the word partially or fully matches the form name. The calculation divides by the number of words in the form (N) to normalize the frequency if the form has a large numbers of words.

The vector space creation system stores in a table the priority of each word in the form. A vector is described as (a1, a2, . . . ak). Where a1, a2 . . . ak are the magnitude in the respective dimensions. For example, for input words and corresponding line heights of a W-2 tax form, the following are word-priority vectors are stored:

| | |
|---|---|
| omb | 10 |
| employer | 5 |
| employer | 5 |
| wages | 5 |
| compensation | 5 |
| compensation | 5 |
| dependent | 5 |
| wages | 10 |
| social | 5 |
| security | 5 |
| income | 5 |
| tax | 5 |
| federal | 5 |
| name | 5 |
| address | 5 |

The normalized valued for the priorities are:

| | |
|---|---|
| omb | 0.666667 |
| employer | 0.666667 |
| wages | 1 |
| compensation | 0.666667 |
| dependent | 0.333333 |
| social | 0.333333 |
| security | 0.333333 |
| income | 0.333333 |
| tax | 0.333333 |
| federal | 0.333333 |
| name | 0.333333 |
| address | 0.333333. |

In such a vector space, the words with larger font size or higher frequency will have higher priority.

The ranking system calculates the cosine distance of two vectors V1 and V2 as:

cos θ=(*V*1·*V*2)/(|*V*1|*|*V*2|)

where V1·V2 is the dot product of two vectors and |V| represents the magnitude of the vector. When the cosine distance nears 0, that means the vectors are orthogonal and when it nears 1 it means the vectors are in the same direction or similar.

The class which has the maximum cosine distance with the form is the class to which the form should be classified, and is shown by module 965.

The class identification system performs point pattern matching based on the image features collected during image processing. As mentioned earlier, the point pattern matching of documents is performed by creating a string from the points detected in the image and then using Levenshtein distance to measure the gap between the trained set with the input image.

In the preferred embodiment, the results of the ranking and the point pattern matching are used to determine the class matching values. If the system is not successful in finding a class match within a defined threshold, the document is marked as unclassified by the success evaluation module defined above.

Figure 10:
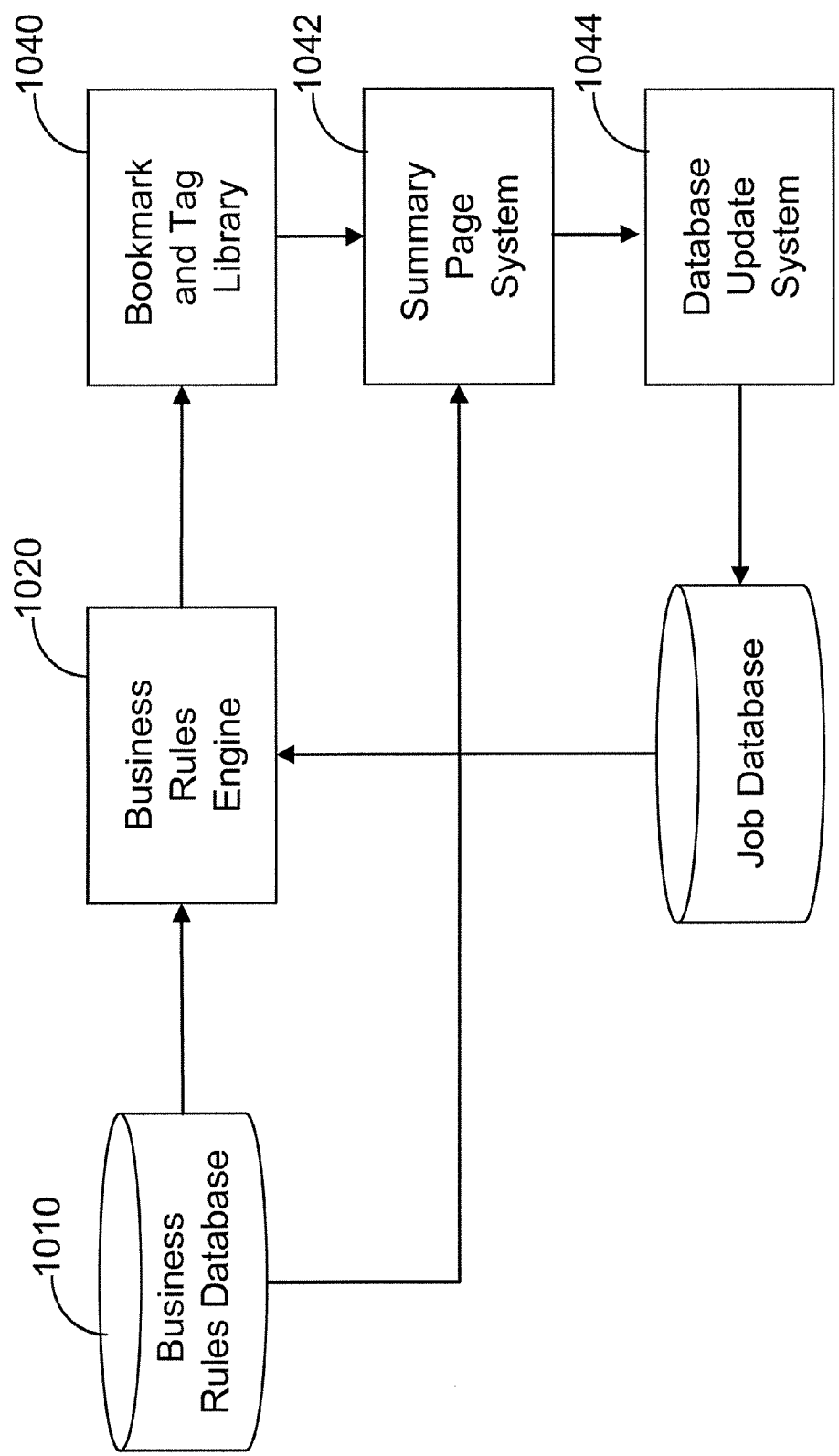
FIG. 10 illustrates an organized document development system according to a preferred embodiment of the disclosed subject matter.

FIG. 10 is a system diagram of the organized document development system. System 564 has a business rules database 1010, a business rules engine 1020, a bookmark and tab library 1040, a summary page system 1042 and a database update system 1044.

The business rules database stores rules that determine the ordering of documents for a given domain. For example, a simple business rule for organizing tax documents is to organize all wage related documents like W-2's first, followed by interest income documents, etc.

The business rules engine identifies and orders the information in the jobs database. The business rules engine applies the rules in the business rules database to the documents in the jobs database.

The FIG. 11 shows such an example of an automatically organized tax source document using the system.

The bookmark and tag library creates an organized electronic document based on the outputs of the business rules engine.

The summary page system creates a summary of key document data. In the preferred implementation, the summary includes a table of contents, the date and time the document was processed, the name of the job, etc.

In the preferred implementation, after the document is fully organized, the document is stored in the job database, the job is marked completed and appropriate message is sent to the processing server to make the final finished document available to the end user either through their portal.

Figure 12:
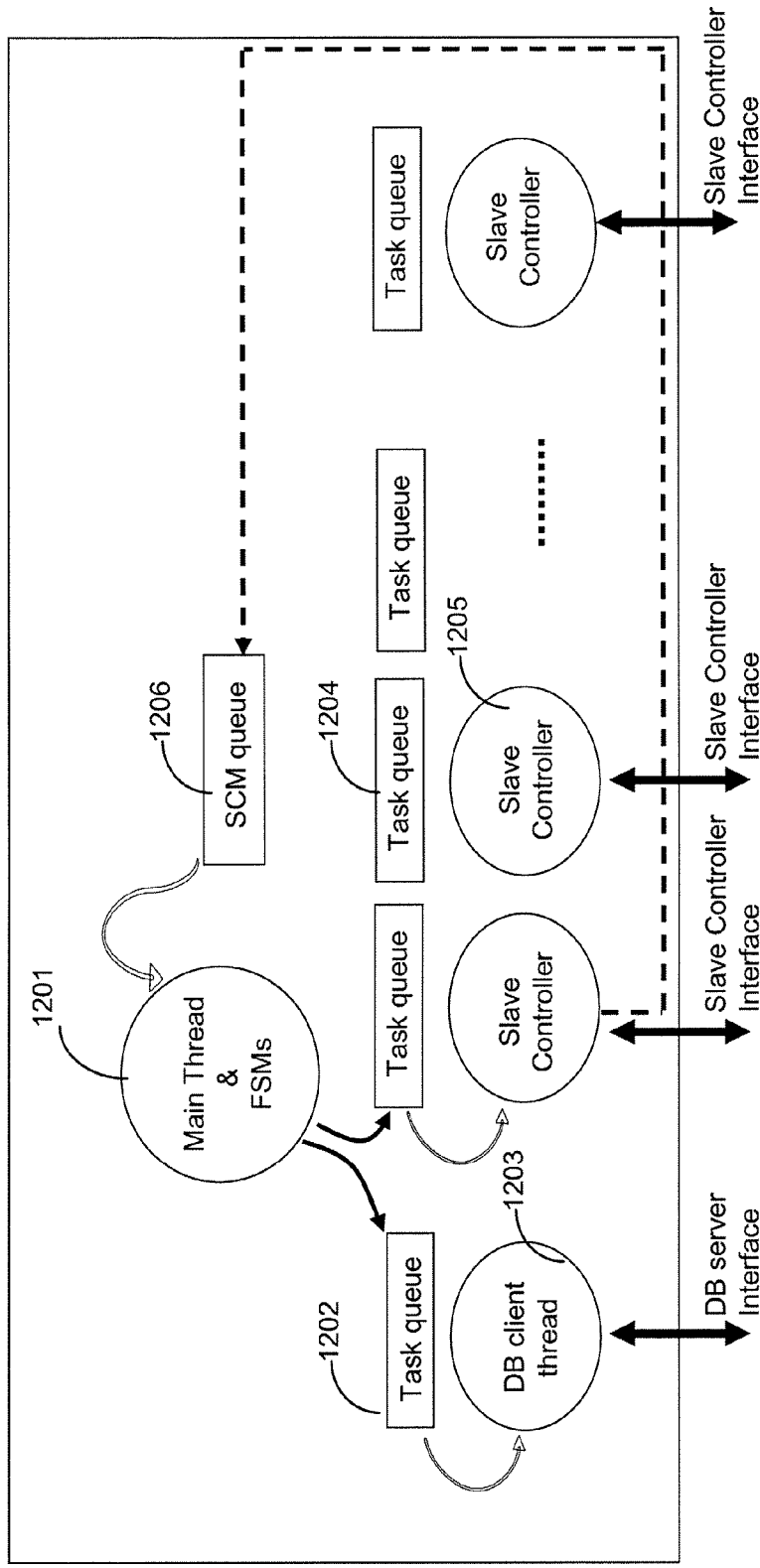
FIG. 12 is a flow diagram of the service control manager 526 according to a preferred embodiment of the disclosed subject matter.

FIG. 12 is a system diagram of the service control manager. System 526 has a main thread 1201, task queues 1202, database client thread controllers 1203, task queues 1204, slave controllers 1205 and SCM queue 1206.

The main thread controls the primary state machine for all the jobs in the system.

Task queues 1202 provide message queues for database communication.

Database client thread controllers manage the database server interface.

Task queues 1204 provide message queues for communication with slave controllers.

Slave controllers manage various slave processes via the slave controller interface.

The SCM queue provides a mechanism for the various controllers to communicate with the main thread.

In the preferred implementation, various threads communicate between each other using message queues. Whenever a new document is received for processing, the main thread is notified and it requests the DB client thread to retrieve the job for processing based on the states and the queue of other jobs in the system.

In the preferred implementation, once the job is loaded in memory, a finite state machine for that job is created and the job starts to be processed. The main thread puts the job on a particular task queue based on the state machine instructions. For example, if the job needs to be image processed, then the job will be placed on the image processing task queue. If the slave controller for the image processing slave finds an idle image processing slave process, then the job is picked up from that queue and given to the slave process for processing. Once the slave finishes performing its assigned task, it returns the job to the slave controller which puts the job back on the SCM queue. The main thread sequentially picks up the job from the SCM queue and decides on the next state of the job based on the FSM states. Once a job is completed, the FSM for the job is closed and the organized document is returned to the repository and made available to the client's portal as a finished and processed document.

Figure 13:
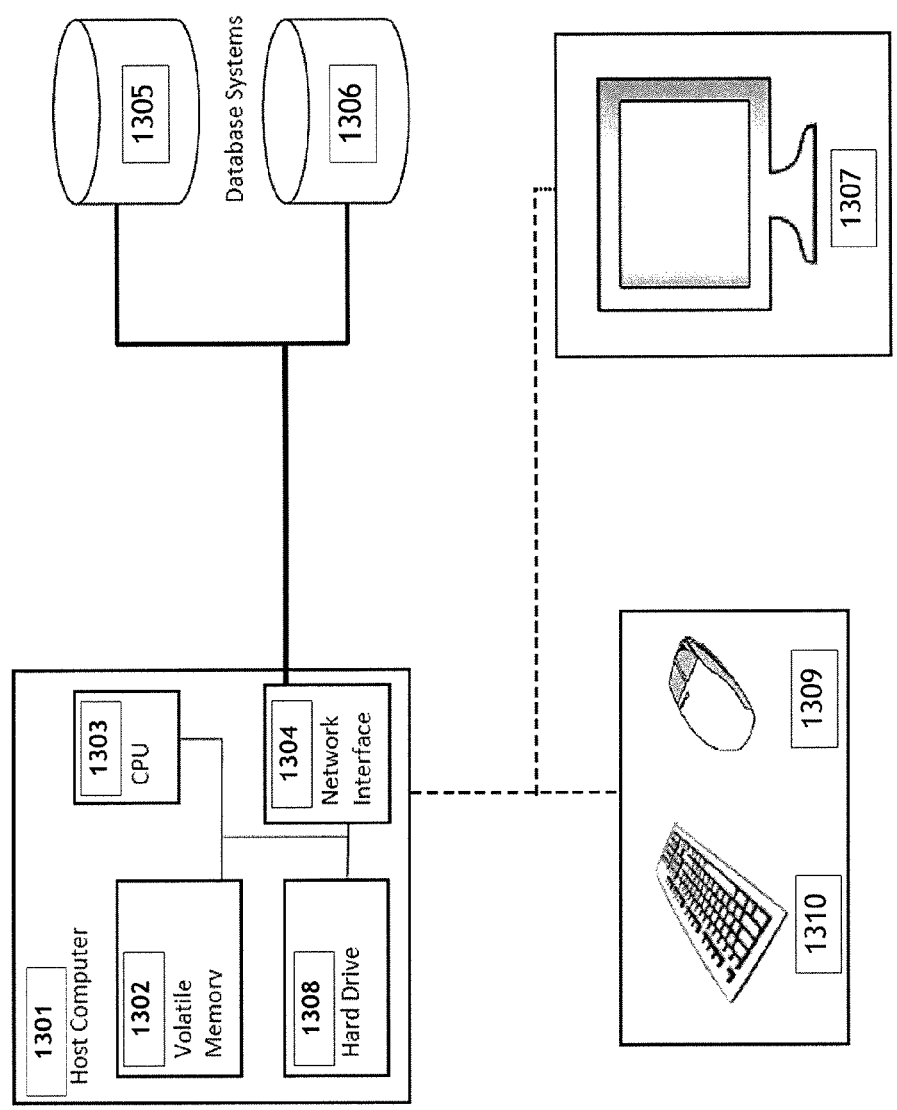
FIG. 13 illustrates an exemplary computer system on which the described invention may run according to a preferred embodiment of the disclosed subject matter.

FIG. 13 is a diagram that depicts the various components of a computerized document analysis system according to certain embodiments of the invention. The method of enhancing the received electronic documents is performed by a host computer, 1301 that contains volatile memory, 1302, a persistent storage device such as a hard drive, 1308, a processor, 1303, and a network interface, 1304. Using the network interface, the system computer can interact with databases, 1305, 1306. Although FIG. 13 illustrates a system in which the system computer is separate from the various databases, some or all of the databases may be housed within the host computer, eliminating the need for a network interface. The programmatic processes may be executed on a single host, as shown in FIG. 13, or they may be distributed across multiple hosts.

The host computer shown in FIG. 13 may serve as a document analysis system. The host computer receives electronic documents from multiple users. Workstations may be connected to a graphical display device, 1307, and to input devices such as a mouse 1309, and a keyboard, 1310. Alternately, the active user's work station may comprise a handheld device.

In some embodiments, the flow charts included in this application describe the logical steps that are embodied as computer executable instructions that could be stored in computer readable medium, such as various memories and disks, that, when executed by a processor, such as a server or server cluster, cause the processor to perform the logical steps.

While text extraction and recognition may be performed using OCR or OCR-like techniques it is not limited to such. Other techniques could be used, including image recognition-like techniques.

Organizing electronic documents is not limited to bookmark and/or folder approaches. It includes any ways in which it can be made easier to find and use the documents, such as document tagging.

As described above, preferred embodiments extract image features from a document and use this to assist in classifying the document category. These image features include inherent image features, e.g., lines, line crossings, etc. that are put in place by the document authors (or authors of an original source or blank document) to organize the document or the like. They were typically not included as a means of identifying the document, even though the inventors have discovered that they can be used as such, especially with the use of machine learning techniques.

While many applications can benefit from extracting both image and text features so that the extracted features may be used to classify documents, for some applications, image features alone may suffice. Specifically, some problem domains may have document categories where the inherent image features are sufficiently distinctive to classify a document with high enough confidence (even without processing text features).

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. In a document analysis system including a server, a method of enhancing electronic documents to improve automatic recognition and classification of the electronic documents, the method comprising:
   receiving, by the server, jobs containing job documents from a plurality of users, wherein each received job document is a binarized, one-bit-per-document-pixel image version of an original grayscale or color image source document;
   filtering, by the server, each page of the received binarized document to infer binarized background artifacts which result from the binarization of the original grayscale or color image source document and reside in the vicinity of binarized text and binarized image features in the page;
   distinguishing, by the server, the binarized text and binarized image features from the binarized background artifacts;
   extracting, by the server, the binarized text and binarized image features from the received binarized document;
   automatically recognizing and classifying, by the server, the received binarized document into a document category by using the extracted binarized text and binarized image features;
   organizing, by the server, each received job according to the document category of the corresponding job document; and
   removing, by the server, the binarized background artifacts, wherein the removal of the binarized background artifacts is performed after the binarized document image is inverted to white-on-black.

2. The method of claim 1, wherein the received binarized document includes a document binarized using at least two local threshold values that are based on local contents in the document.

3. The method of claim 1, wherein the removal of the binarized background artifacts is performed utilizing Gaussian filtering.

4. The method of claim 1, wherein the binarized background artifacts include dots and wherein at least one of a minimum dot size and a maximum dot size is specified for removal of the dots.

5. The method of claim 1, wherein the binarized background artifacts include blobs and wherein a sliding mask is utilized to detect and remove the blobs.

6. The method of claim 5, wherein the blobs that are greater than a predetermined number of pixels in size are removed.

7. The method of claim 1, wherein the binarized background artifacts include dots, specks, and blobs.

8. The method of claim 1 further comprising enabling a human trainer to assist in classifying documents to be used to train the automatic recognition and classification of subsequently-received documents.

9. The method of claim 1 further comprising automatically separating, by the server, each job into constituent electronic documents and automatically separating each electronic document into subsets of electronic pages.

10. The method of claim 9 wherein the subset comprises an electronic page.

11. The method of claim 9 wherein each page of each subset is processed independently and in parallel.

12. The method of claim 9 wherein the subset comprises a part of an electronic page of the constituent electronic document.

13. The method of claim 1 further comprising training the document analysis system to automatically classify each document into a corresponding document category and to automatically organize each job according to the document categories it contains.

14. The method of claim 13 wherein extracting the binarized text and binarized image features from the received binarized document comprises recognizing, by the server, the binarized text and binarized image features of the received binarized document as part of a workflow.

15. The method of claim 1 further comprising comparing, by the server, the extracted binarized text and binarized image features with feature sets associated with each category of document.

16. The method of claim 15 further comprising classifying, by the server, each received binarized document to a document category, the feature set of which best matches the extracted binarized text and binarized image features of the received binarized document.

\* \* \* \* \*